United States Patent
Campbell

(12) 
(10) Patent No.: US 7,108,925 B2
(45) Date of Patent: Sep. 19, 2006

(54) HIGH TEMPERATURE INSULATION UTILIZING ZIRCONIA-HAFNIA

(75) Inventor: Christian X. Campbell, Orlando, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 149 days.

(21) Appl. No.: 10/667,737

(22) Filed: Sep. 22, 2003

(65) Prior Publication Data

US 2005/0064245 A1   Mar. 24, 2005

(51) Int. Cl.
*B32B 15/04* (2006.01)
(52) U.S. Cl. ........................... 428/701; 428/698
(58) Field of Classification Search ............. 428/693, 428/701, 688, 689; 501/105, 103
See application file for complete search history.

(56) References Cited

U.S. PATENT DOCUMENTS

| | | | |
|---|---|---|---|
| 4,552,852 A * | 11/1985 | Manning | 501/105 |
| 6,013,592 A | 1/2000 | Merrill et al. | |
| 6,106,959 A * | 8/2000 | Vance et al. | 428/623 |
| 6,197,424 B1 * | 3/2001 | Morrison et al. | 428/402 |
| 6,287,511 B1 * | 9/2001 | Merrill et al. | 264/651 |
| 6,558,814 B1 | 5/2003 | Spitsberg et al. | |
| 6,733,908 B1 * | 5/2004 | Lee et al. | 428/702 |
| 2003/0035907 A1 | 2/2003 | Campbell et al. | |

* cited by examiner

*Primary Examiner*—Jennifer C. McNeil
*Assistant Examiner*—Daniel Miller

(57) ABSTRACT

A ceramic insulating composition including monoclinic zirconia-hafnia. The zirconia-hafnia may be used as a filler powder (14) in a ceramic composition (10), or it may be used as a protective overlayer (50). The zirconia-hafnia (24) may be combined with alumina (22) to achieve a desired elastic modulus. The portion of hafnia contained in the zirconia-hafnia is selected to provide a predetermined phase transition temperature to minimize undesired phase changes during high temperature use of the material.

10 Claims, 3 Drawing Sheets

HIGH TEMPERATURE INSULATION UTILIZING ZIRCONIA-HAFNIA

FIELD OF THE INVENTION

This invention relates generally to the field of materials and more particularly to ceramic materials adapted for use in high temperature environments.

BACKGROUND OF THE INVENTION

Ceramic insulating materials are well known for protecting alloy and composite substrate materials from high temperature environments. Incorporated by reference herein are U.S. Pat. Nos. 6,013,592 and 6,197,424 that describe high temperature insulations for ceramic matrix composite materials. Further protection against a high temperature water vapor environment may be provided by a protective coating applied over the insulating material, as described in U.S. patent application publication 2003/0035907, also incorporated by reference herein.

BRIEF DESCRIPTION OF THE DRAWINGS

These and other advantages of the invention will be more apparent from the following description in view of the drawings that show.

DETAILED DESCRIPTION OF THE INVENTION

The present inventor has found that a solid solution of zirconia-rich hafnia (Zr:HfO$_2$) may be used to provide an improved ceramic insulating material. Zirconia-hafnia may be incorporated into the bulk of an insulating material, such as being used as a filler material, or it may be disposed as a layer on a top surface of an insulating material.

Figure 1:
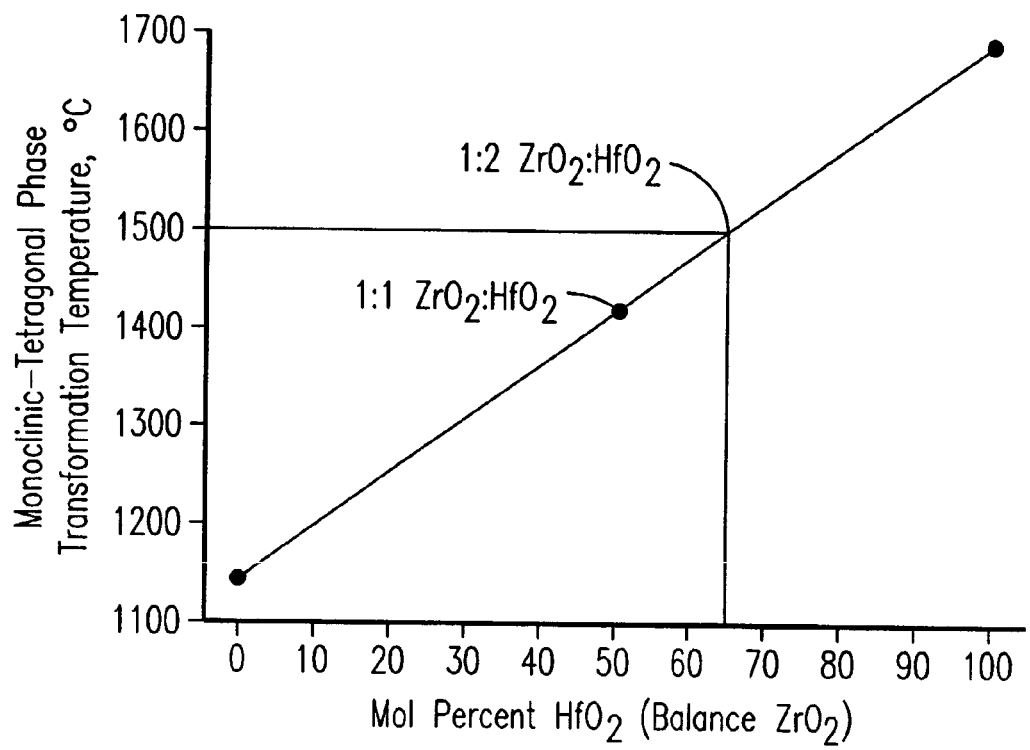
FIG. 1 is a graph of the relationship of the monoclinic-tetragonal phase transformation temperature to the mol percentage of hafnia in zirconia-hafnia, as is known in the art.

Hafnium occurs naturally only in zirconium minerals. Solvent extraction methods are used to separate the two metals, and pure hafnia (HfO$_2$) is known to be expensive. The monoclinic-tetragonal phase transformation temperature of zirconia-hafnia will increase approximately linearly from about 1,140° C. for pure zirconia to about 1,690° C. for pure hafnia, as shown in FIG. 1. The present invention exploits this relationship in a balance against cost effectiveness by utilizing zirconia-hafnia having a mol percentage of hafnia that is appropriate for various applications.

Figure 2:
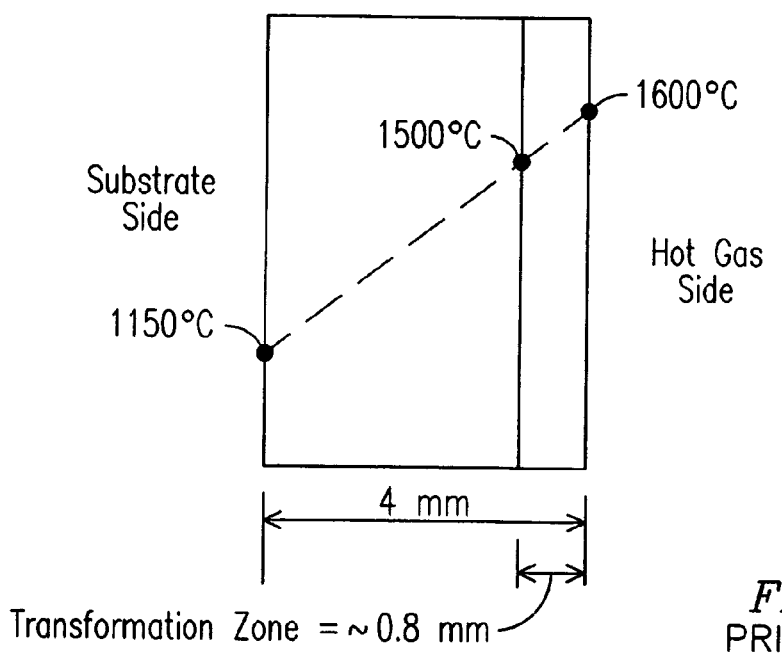
FIG. 2 is a cross-sectional view of a layer of ceramic insulation illustrating the temperature of the material as a function of the distance from the hot side surface.

It is generally desirable to avoid a phase transformation in an insulating material over the operating temperature range of the material in order to avoid the volume change associated with the phase change. Also, the monoclinic phase of zirconia and hafnia is the desired phase for thermal insulation applications, i.e. low thermal expansion and low elastic modulus. If a phase transformation does occur, the transforming material should be remote from the interface between the insulating material and the underlying substrate material in order to avoid spalling of the insulation. FIG. 2 illustrates the peak temperature that may be experienced in an example ceramic thermal barrier coating material in a 1,600° C. environment, such as may be experienced in a gas turbine engine. The temperature of the insulation material varies in this example from 1,600° C. at the hot gas surface to 1,150° C. on the substrate material side. For a 4 mm thick coating, only the top 20% of the material is exposed to a temperature greater than 1,500° C. If a phase transformation is permitted to occur throughout no more than 20% of the thickness of the material remote from the substrate material at a predetermined use temperature, it should be sufficiently isolated from the insulation/substrate interface to minimize the concern for spalling. Referring back to FIG. 1, it may be appreciated that a 1:2 ratio of zirconia/hafnia (66 mol % hafnia) provides a transformation temperature of 1,500° C. Accordingly, if 1:2 zirconia-hafnia were used as a constituent part of this example thermal insulation material, the zirconia-hafnia would remain in the monoclinic phase throughout the coolest 80% of the insulation depth, which is the region closest to the substrate/insulation interface. The volume change associated with the phase change in the hottest 20% of the insulation may not create an unacceptable level of stress at the insulation/substrate interface. While other applications may involve different peak temperatures, insulation thicknesses, mechanical sensitivity to a phase change, etc., the present inventor believes that zirconia-hafnia containing at least 20 mol % and less than 100 mol % hafnia, or in the range of 50–95 mol % hafnia, or 60–75 mol % hafnia, would provide a useful balance between cost and performance when used in gas turbine applications.

To appreciate the benefit of using zirconia-hafnia in an insulation material composition, a comparison is made to an example prior art insulation material similar to those compositions described in U.S. Pat. Nos. 6,013,592 and 6,197,424. This prior art insulation material may be co-processed with an oxide-oxide ceramic matrix composite (CMC) substrate material sold under the brand name A/N720-1 by COI Ceramic, Inc. of San Diego, Calif. (www.coiceramics.com) A/N720-1 material utilizes Nextel® N720 fibers (85% alumina and 15% silica in the form of mullite and alumina polycrystals) disposed in an alumina matrix. A protective layer of thermally insulating material is used to protect A/N720-1 material from the hot combustion gas within a gas turbine engine.

The example prior art insulation may be formed of the following composition:
- a plurality of hollow mullite spheres having diameters ranging from approximately 0.4–1.8 mm
- alumina and/or mullite filler particles of less than 30 microns
- a binder of aluminum hydroxychloride with alumina particles of less than 1 micron.

The aluminum hydroxychloride is an alumina precursor that enhances the sinterability of the alumina binding matrix between the mullite spheres and the filler particles.

Figure 3:
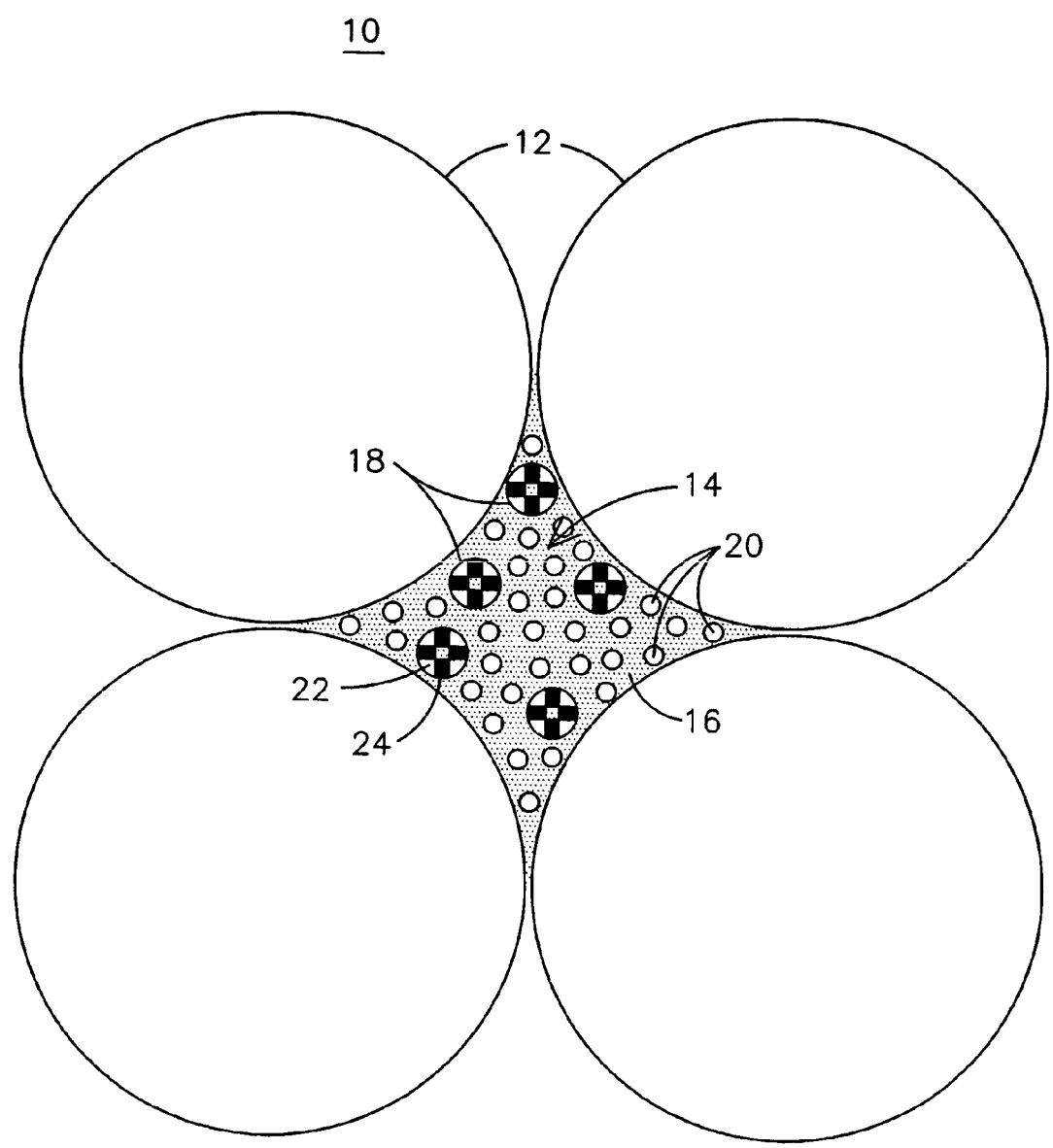
FIG. 3 is an illustration of the constituent parts of a thermal insulation including a composite powder containing zirconia-hafnia.

One exemplary embodiment of the present invention replaces at least some of the alumina and/or filler particles of the prior art material with zirconia-hafnia. FIG. 3 is a highly magnified partial cross-section view of such high temperature insulation 10. Insulation 10 includes a plurality of oxide shapes 12 such as the illustrated hollow spheres, a filler powder material 14, and a binder matrix material 16 partially filling gaps between the hollow oxide spheres 12 and the filler powder 14. The oxide shapes 12 may be hollow, essentially solid or porous. In one embodiment they may be hollow mullite spheres having diameters ranging from approximately 0.4–1.8 mm. The other materials of the composition may separate the spheres 12 from each other, or if improved dimensional stability is desired, each sphere 12 may be in contact with one or more other spheres 12. The binder material 16 may be byproduct of aluminum hydroxychloride and an alumina powder having particle sizes less than 1 micron.

The filler powder 14 includes composite particles 18 and alumina particles 20. In other embodiments the filler powder may include mullite particles, and there may be embodiments including both mullite and aluminum filler particles depending upon the performance requirements of the particular application. The composite particles 18 include a first constituent of alumina 22 and a second constituent of monoclinic zirconia-hafnia 24. The composite particles 18 of the present invention may be used to replace some or all of the alumina and/or mullite filler particles in prior art ceramic insulation compositions. The proportion of zirconia-hafnia 24 in the composite particles 18 may range anywhere from greater than 0% up to 100%. The elastic modulus of the composite particles 18 will vary with the ratio of the two constituents. Although experimental data is not available to the present inventor, it is expected that an alumina content of approximately 20–50 mol % will reduce the elastic modulus of the composite particles 18 to close to that of mullite (approximately 150 GPa). As described above, the mol percentage of hafnia in the zirconia-hafnia 24 may range from 50–95 mol % depending upon the requirements of the particular application.

Monoclinic zirconia-rich hafnia powder is made by a chemical process and the particle size is relatively fine, typically ranging from 1–5 microns. Such fine particles may become situated between particles of the binder material 16 and may result is a fairly weak matrix. Furthermore, fine filler powder particles could migrate to the insulation/substrate interface and may prevent a good bond. A larger composite filler particle average size, such as at least 30 microns or in the range of 30–50 microns or 10–100 microns, may be desired. Accordingly, the as-processed zirconia-hafnia powder may be post-processed to obtain a powder size that is more suitable as a filler powder. Spray-drying a zirconia-hafnia:alumina powder and firing the powder at a high temperature to obtain a thermally stable powder may accomplish this. It may be necessary to control the temperature regiment to be certain that the material remains primarily in a monoclinic phase. The powder is than milled to a desired mesh size, perhaps having an average composite particle size of between 10–100 microns in various embodiments. The composite powder particles 18 can be pre-fired at a temperature close to the expected operating temperature in order to stabilize the microstructure of the particles 18 and to ensure that the composite is dimensionally stable when used within insulation 10. The alumina 22 in the composite particles 18 forms a strong bond with the alumina binder material 16.

While experimental data is not yet available, the filler powder 14 containing alumina and zirconia-hafnia composite particles 18 is expected to provide insulation 10 with performance characteristics that compare favorably to those of the prior art insulations utilizing alumina and/or mullite filler powders. The composite particles 18 will exhibit micro-cracking within the particles themselves due to differential thermal expansion between the two particle constituents 22, 24. Such micro-cracking may occur during the high firing of the particles before the insulation composition is formed, during the firing of the insulation composition, and/or during the use of the insulation 10 in a high temperature environment. Advantageously, this micro-cracking damage is contained within the discreet volume of the composite particles 18 and does not have a tendency to propagate throughout the entire material matrix. This micro-cracking and the inherent properties of the monoclinic zirconia-hafnia should contribute to the relatively lower thermal conductivity and low elastic modulus of the insulation 10. Insulation 10 is expected to exhibit improved toughness and thermal shock performance when compared to similar prior art materials utilizing only alumina and/or mullite filler particles. Insulation 10 should also be less vulnerable to high temperature water vapor attack than prior art materials utilizing mullite fillers due to the inherent properties of zirconia and hafnia. It is expected that these improvements may be achieved with only minimal processing changes from the prior art. Insulation 10 should also be chemically compatible with A/N720-1 CMC material and may be co-processed therewith as a protective insulating layer disposed on an A/N720-1 CMC substrate. A limiting factor in the use of monoclinic zirconia-hafnia powders is the high cost of hafnia. The present inventor has reduced this cost impact in the exemplary embodiment by using zirconia-rich hafnia 24 and also by forming a composite powder 18 with alumina 22 rather than using the as-processed zirconia-hafnia powder.

Figure 4:
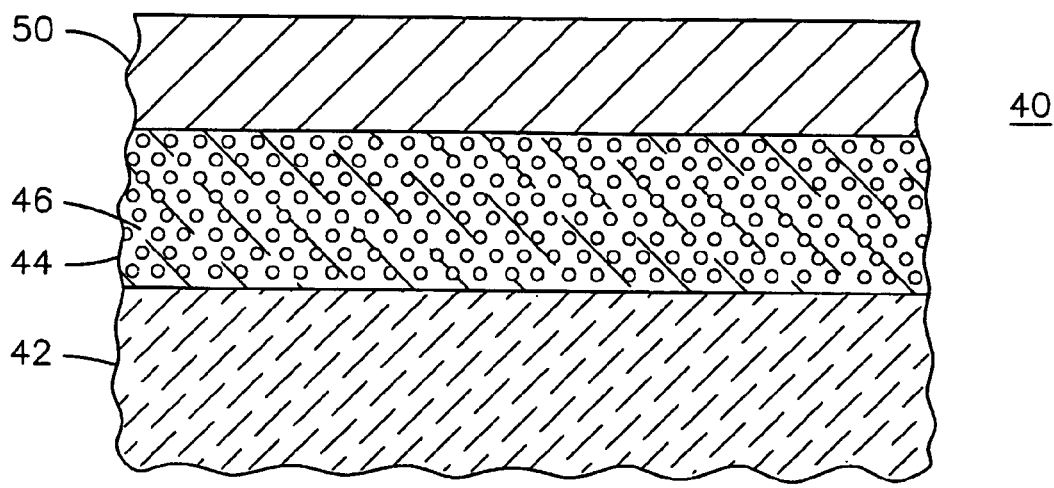
FIG. 4 is a partial cross-sectional view of a component formed of a ceramic matrix composite substrate material covered with a ceramic oxide insulating material, which in turn is protected by a zirconia-hafnia coating.

In another exemplary embodiment, monoclinic zirconia-hafnia may be used as a protective coating material for ceramics and ceramic matrix composite materials. FIG. 4 is a partial cross-sectional view of a component 40 of a gas turbine engine. The component 40 is formed of a substrate 42 of a ceramic matrix composite material that is thermally protected by a ceramic insulating coating 44. The ceramic matrix composite substrate 42 and ceramic insulating coating 44 may be of the type described in U.S. Pat. No. 6,013,592 discussed above. Ceramic insulating coating 44 is an oxide based ceramic including a matrix material 46 surrounding a plurality of mullite spheres 48. The matrix material 46 may include a mullite filler powder and a phosphate binder or an alumina filler powder and an alumina binder. The mullite-based ceramic insulating coating 44 would be susceptible to silica loss and/or recession if it were exposed to a typical gas turbine combustion environment of high temperature, high pressure and high flow rates. Accordingly, an protective overlayer 50 is disposed over the ceramic insulating coating 44 to isolate the ceramic insulating coating 44 from water vapor contained in the hot gas environment in which component 40 is designed to operate. The protective overlayer 50 is a monoclinic zirconia-rich hafnia applied to any desired thickness by any known deposition process, such as slurry coating, sol-gel, chemical vapor deposition, physical vapor deposition or plasma spray. As described above, the mol percentage of hafnia in the layer 50 may range from 50–95 mol % depending upon the requirements of the particular application to minimize any problem resulting from a transformation from the monoclinic phase to the tetragonal phase during the use of the component 40. The protective overlayer 50 may be 100% zirconia-hafnia or it may be a composite of zirconia-hafnia and alumina, with the percentage of alumina ranging from 0 to approximately 100%.

Figure 5:
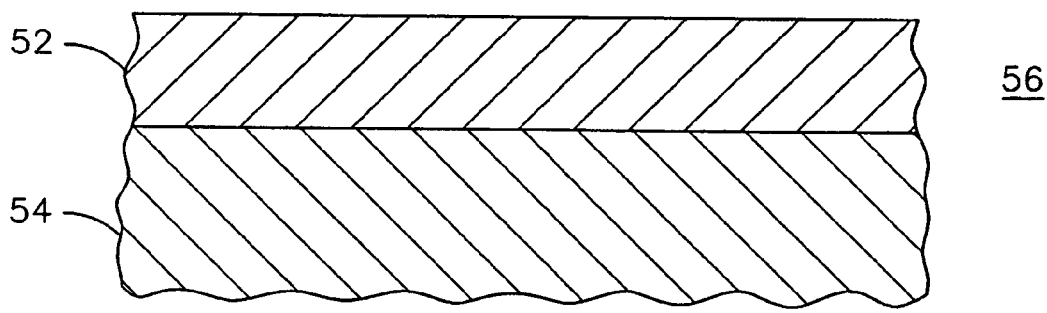
FIG. 5 is a partial cross-sectional view of a refractory oxide ceramic combustor tile formed of a ceramic oxide protected by a layer of zirconia-hafnia.

FIG. 5 illustrates a layer of zirconia-hafnia 52 disposed over a ceramic oxide substrate 54 to form a refractory oxide ceramic combustor tile 56. The ceramic oxide substrate 52 may be mullite, zircon, an aluminosilicate or a sodium zirconium phosphate, for example. Layer 52 may be deposited by slurry coating, sol-gel, chemical vapor deposition, physical vapor deposition or plasma spray. The protective overlayer may be formed to have a porosity of greater than 10%, or preferably greater than 15%, in order to provide the material with an improved resistance to thermal shock loadings. Such porosity is not problematic in this embodiment since the underlying oxide material is not vulnerable to oxidation attack, and is only vulnerable to high velocity water vapor attack. Furthermore, the thickness of layer 52 of greater than 0.1 mm ensures protection against moisture penetration in spite of such porosity, and it provides additional margin against erosion of the protective overlayer 52. The layer of zirconia-hafnia 52 acts as a barrier for the underlying ceramic oxide substrate 54 against a high temperature, high flow rate, moisture-bearing operating environment. The mol percentage of hafnia in the layer 52 is selected to eliminate or minimize phase changes during high temperature operation. The layer of monoclinic zirconia-hafnia 52 also acts as a barrier for the underlying ceramic oxide substrate 54 in combustion type applications, such as gas turbines, where degradation of the underlying ceramic oxide substrate 54 would be further accelerated by high gas pressures.

Figure 6:
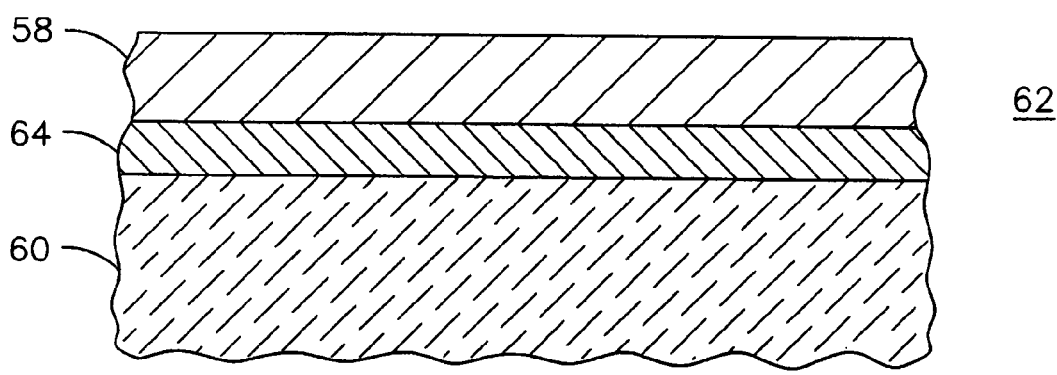
FIG. 6 is a partial cross-sectional view of a non-oxide ceramic substrate material protected by a zirconia-hafnia coating, wherein an oxygen barrier layer is disposed between the non-oxide substrate and the protective coating.

FIG. 6 illustrates the use of a layer containing monoclinic zirconia-hafnia 58 as a protective overlayer coating for a non-oxide ceramic substrate 60, such as silicon carbide or silicon nitride, to form an article 62. In this embodiment, the substrate 60 may be vulnerable to oxidation attack that could result in spalling of any overlying coating. To prevent such oxidation, an oxygen barrier layer 64 is disposed between the non-oxide ceramic substrate 60 and the zirconia-hafnia layer 58. The barrier layer 64 prevents the migration of oxygen from the environment to the underlying oxide layer 60. The barrier layer 64 should be selected to be chemically and physically compatible with layers 58, 60 and may be mullite, zircon ($ZrSiO_4$), or zirconium phosphate, for example. The barrier layer 64 may be deposited by any of the above-described deposition methods and may have a thickness of 10–100 microns, for example.

While various embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

I claim as my invention:

1. A ceramic composition comprising:
   a plurality of oxide shapes;
   a filler powder comprising particles of zirconia-hafnia; and
   a binder material partially filling gaps between the oxide shapes and the filler powder;
   wherein the filler powder particles comprise an average size of at least 30 microns and exhibit micro-cracks contained within the particles and not propagated into the binder material.

2. The composition of claim 1, wherein the portion of hafnia in the zirconia-hafnia is in the range of 50–95 mol %.

3. The composition of claim 1, wherein the portion of hafnia in the zirconia-hafnia is in the range of 60–75 mol %.

4. The composition of claim 1, wherein the portion of hafnia in the zirconia-hafnia is at least 20 mol % and less than 100 mol %.

5. The composition of claim 1, wherein the filler powder comprises composite particles each comprising zirconia-hafnia and alumina.

6. The composition of claim 5, wherein the portion of alumina in the composite particles is in the range of 20–50 mol %.

7. The composition of claim 1, wherein the filler powder comprises particles having an average size range of 30–50 microns.

8. The composition of claim 1, further comprising:
   the oxide shapes comprising hollow mullite spheres;
   the filler powder comprising composite particles comprising zirconia-hafnia and alumina; and
   the binder material comprising alumina.

9. The composition of claim 1 disposed on an oxide-oxide ceramic matrix composite substrate material.

10. The composition of claim 9, wherein the portion of hafnia in the zirconia-hafnia is selected to limit a phase transformation of the zirconia-hafnia from a monoclinic phase to a tetragonal phase to occur throughout no more than 20% of a thickness of the material remote from the substrate material at a predetermined use temperature.

* * * * *